C. O. DALE.
LOGGING BUNK.
APPLICATION FILED DEC. 18, 1913.

1,105,827.

Patented Aug. 4, 1914.
2 SHEETS—SHEET 1.

WITNESSES:
F. C. Matheny
Frank Warren

INVENTOR
Charles O. Dale
BY
C. D. Haskins
ATTORNEY

THE NORRIS PETERS CO., PHOTO-LITHO., WASHINGTON, D. C.

C. O. DALE.
LOGGING BUNK.
APPLICATION FILED DEC. 18, 1913.
1,105,827.
Patented Aug. 4, 1914.
2 SHEETS—SHEET 2.
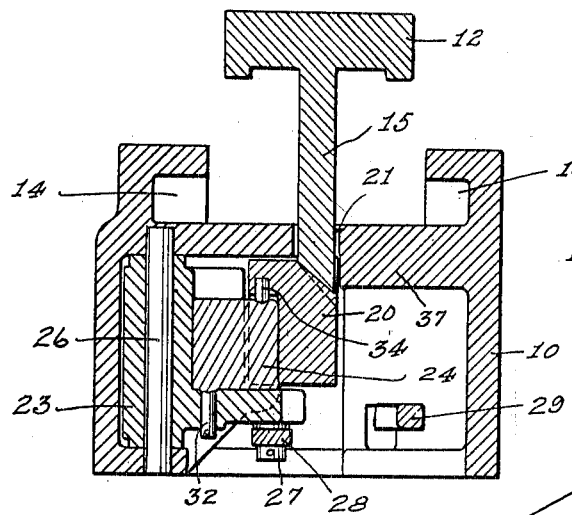
Fig. 4
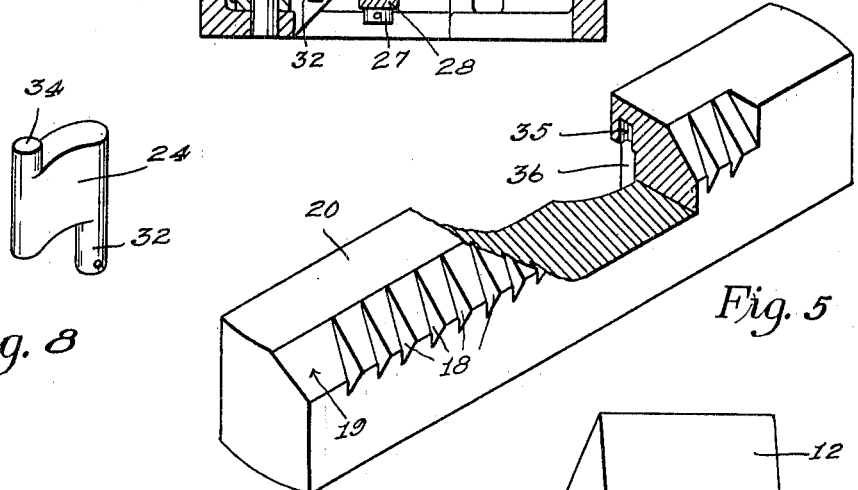
Fig. 8
Fig. 5
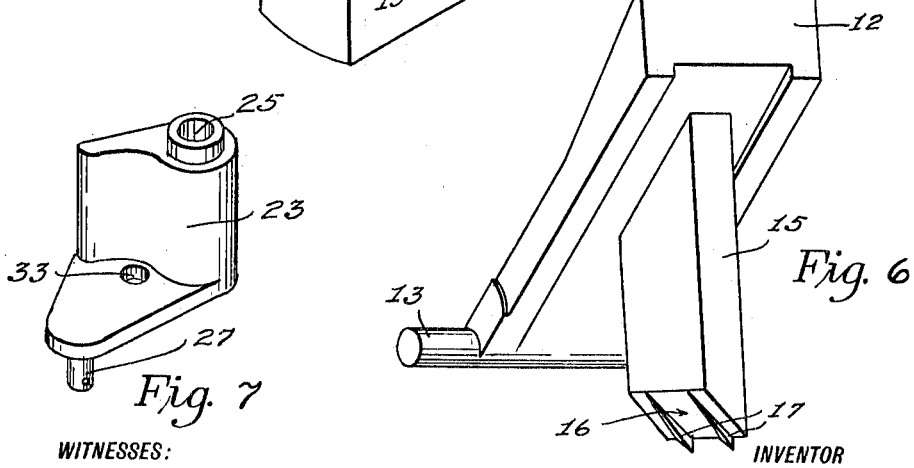
Fig. 7
Fig. 6
WITNESSES:
F. C. Matheny
Frank Warren
INVENTOR
Charles O. Dale
BY
C. D. Haskins
ATTORNEY
THE NORRIS PETERS CO., PHOTO-LITHO., WASHINGTON, D. C.

UNITED STATES PATENT OFFICE.

CHARLES O. DALE, OF SEATTLE, WASHINGTON, ASSIGNOR OF FOUR-TENTHS TO AXEL PETERSON, OF RENTON, WASHINGTON.

LOGGING-BUNK.

1,105,827.  Specification of Letters Patent.  Patented Aug. 4, 1914.

Application filed December 18, 1913. Serial No. 807,521.

*To all whom it may concern:*

Be it known that I, CHARLES O. DALE, citizen of the United States, residing at Seattle, in the county of King and State of Washington, have invented a certain new and useful Improvement in Logging-Bunks, of which the following is a specification.

My invention relates to improvements in car bunks and stakes that are adapted to be used on flat cars or trucks whereon logs of timber or other like articles are to be placed for transportation, and the object of my improvement is to provide a strong and simple car bunk, embodying at each of its ends a car stake that easily and quickly may be moved longitudinally of such bunk whereby such stake always may be placed snugly against the outermost timbers of the load more securely to hold such timbers in place on the car.

A further object of my invention is to provide a stake associated with suitable mechanism whereby it may be tripped from the opposite side of the car and may be caused to drop below the plane of the top surface of the bunk to be completely out of the way when so tripped.

I accomplish these objects by devices illustrated in the accompanying drawings, in which—

Figure 1:
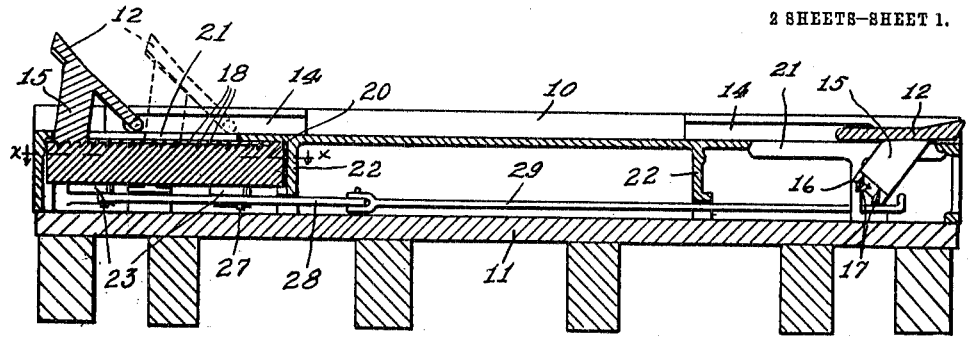
Figure 2:
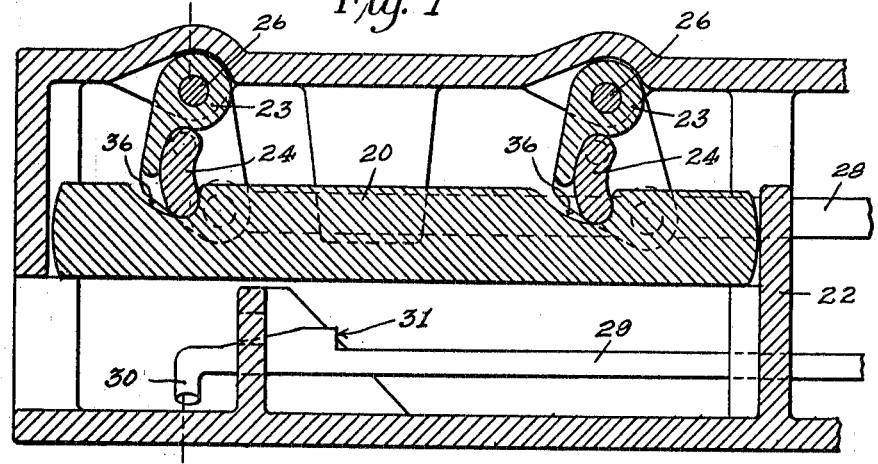
Figure 3:
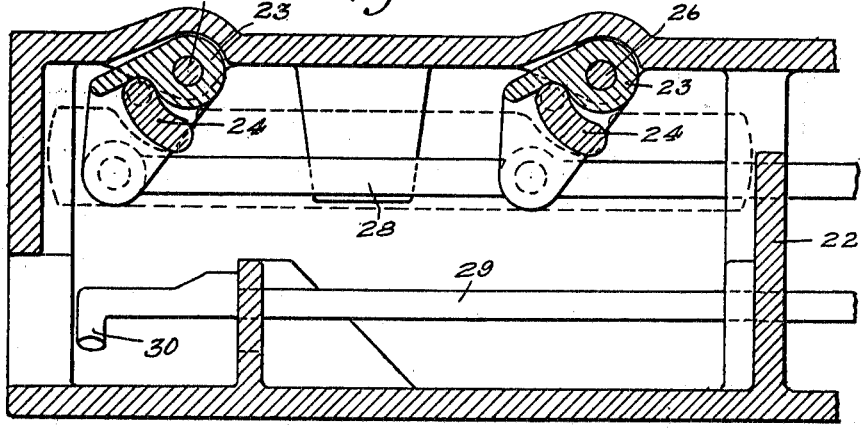

Figure 1 is a view in longitudinal vertical section of a car bunk embodying my invention as it may appear when associated with a flat car that is shown in cross-section; Fig. 2 is an enlarged view in cross-section on broken line $x$, $x$ of Fig. 1; Fig. 3 is a similar view showing certain portions of the mechanism in a different position; Fig. 4 is a view in cross-section on broken line $y$, $y$ of Fig. 2; Fig. 5 is a view in perspective of a detail of my invention a portion of the same being broken away more clearly to illustrate certain other portions; Fig. 6 is a view in perspective of the stake embodied in my invention and Figs. 7 and 8 are views in perspective of details of my invention.

Referring to the drawings throughout which like reference numerals indicate like parts 10 is a car bunk having two similarly constructed ends and adapted to be secured to a set of car trucks or to the deck of a flat car 11, as illustrated in Fig. 1, to extend crosswise thereof, two or more of such bunks thus forming a support on which logs or timbers may be placed for transportation.

Each end of the bunk 10 is provided with a movable stake 12 that is adapted when raised to project upwardly as shown at the left end of Fig. 1, and when lowered to lie below the plane of the top of the bunk 10 as shown at the right end of Fig. 1. The stakes 12, 12 are each provided adjacent their lower ends with pivot members 13, 13 that project outwardly from the opposite edges of such stakes and are adapted to fit and move in oppositely disposed slots or guideways 14, 14 that are provided on the inner surfaces of each of the side members of the bunk 10, the forward end of each of such guideways 14, 14 being preferably left open whereby the pivots 13, 13 of the stake 12 easily may be inserted or removed. The stakes 12 are each provided with an angularly disposed supporting leg 15 that projects rearwardly and downwardly therefrom by which the stake is supported when in its upright position, the lower end of the supporting leg 15 being beveled, as illustrated in Fig. 6, to form a surface 16 that is disposed at an angle to the horizontal, and the surface 16 being provided with a plurality of peculiarly shaped pawls 17, 17, as shown in Fig. 6, that are adapted to fit into correspondingly shaped notches 18, 18 which are formed in an inclined surface 19 of a block 20 on which the supporting leg 15 is adapted to rest when the stake 12 is raised, as shown in Fig. 4, the supporting leg 15 being adapted to project downwardly through a slot 21 provided in the top of the bunk 10. The block 20, more clearly shown in Fig. 6, is disposed to lie lengthwise between the end wall of the bunk 10 and a partition 22, as shown in Figs. 1 and 2, and is adapted to be moved sidewise, as indicated by broken lines in Fig. 2, to permit the supporting leg 15 to drop downwardly through the slot 21. The mechanism for moving such block 20 sidewise consists in two sets of shifting members each of which is composed of two peculiarly shaped parts 23 and 24, more clearly illustrated in Figs. 7 and 8, the member 23 being provided at one end with a hole 25 through which a pin 26 may be passed to secure such member to the bunk frame 10 and at the other end with a downwardly projecting pivot stud 27 to which an actuating link 28 may be secured, the end of the link 28 being pivotally connected with a trip rod 29 which extends to a point that is easily accessible from the opposite side of the car and is there provided with a suitable handhold 30 and with a catch 31 by means of which it may be secured in a fixed position.

The member 24 is provided at one end with a downwardly projecting pivot stud 32 that is adapted to pass through a suitable perforation 33 provided in the member 23, and at the other end with an upwardly projecting pivot stud 34 that is adapted to project within a suitably formed hole 35 in the block 20, one end of the member 24 being adapted to bear against the concave surface of the member 23 and the other end of the member 24 being positioned within a recess 36 in the block 20 and adapted to bear against the wall thereof, as shown in Fig. 2, the pivot studs 32 and 34 serving to hold the member 24 in its correct position and the ends of the member 24 serving to receive any thrust tending to move the block 20 toward the side of the bunk.

When the bunk 10 is to be put in use the stake 12 may be raised, as shown in Fig. 4, and the trip rod 29 may be moved endwise of the bunk to cause the members 23 and 24 to move from the position shown in Fig. 3, into the position shown in Fig. 2, thus by a toggle movement exerting a force on the block 20 to move it toward the center of the bunk where it may be stopped by engaging with the downwardly projecting edge of the thickened top portion 37 of the bunk 10, the beveled surface 19 of the block 20 being directly below the slot 21 whereby the beveled end 16 of the supporting leg 15 may rest thereon and the pawls 17, 17 may project into and engage with the notches 18, 18 to prevent the stake 12 from dropping downwardly or moving outwardly, said pawls 17, 17 and said notches 18, 18 being of such shape that the stake 12 easily may be moved inwardly to any desired position, as shown by broken lines in Fig. 1, the pawls 17, 17 riding over the notches 18, 18 when the stake is moved inwardly and engaging with such notches 18, 18 to prevent such stake 12 from being moved outwardly by outward pressure that may be exerted thereon.

When handling logs of large diameter it is not always possible to select logs of the proper dimensions snugly to fit between stakes that are secured at a fixed distance apart and for this class of work the adjustable stakes 12 render my car bunk especially advantageous as, for instance, the first layer of such logs may be placed on the bunks on a car and the stakes may then be moved tightly against the outermost logs on either side securely to hold them in position thus preventing the logs from rolling or the load from shifting sidewise on the car.

When the stake 12 is in its raised position it may be lowered by releasing the trip rod 29 at the opposite side of the car and exerting a pressure on the end thereof to move the members 23 and 24 into the position shown in Fig. 3, thus withdrawing the block 20 and permitting the beveled end of the supporting leg 15 to slide off of the beveled surface 19 of the block 20 and the stake 12 to drop below the level of the top of the bunk 10, the angle of the beveled surface 19 of the supporting block 20 and the corresponding angle of the end of the supporting leg 15 being of the proper inclination to cause the supporting leg 15 easily to slide off of the surface 19 even though a heavy pressure is being sustained by the stake 12.

Manifestly changes in details and form of construction of my car bunk may be resorted to without departing from the spirit of my invention or sacrificing any of its advantages.

What I claim is:

1. In a bunk of the class described, the combination with a frame, of a stake associated with said frame, said stake having a beveled portion on its bottom side, and a block, said block having a beveled portion on which the beveled portion of said stake may rest whereby said stake easily may slide off of said block when said block is moved sidewise.

2. In a car bunk of the class described, the combination with a frame, of a stake associated with said frame, a supporting leg provided on said stake, and a block on which said supporting leg may rest said block being adapted to be moved sidewise to permit said supporting leg to drop downwardly to lower said stake.

3. In a car bunk of the class described, the combination with a frame, of a stake associated with said frame, pawls provided on said stake, a block on which said stake may rest, said block being provided with notches in which said pawls may engage to prevent said stake from moving outwardly on said frame and means adapted to move said block sidewise to permit said stake to drop downwardly.

4. In a car bunk of the class described, the combination with a frame, of stakes associated with said frame each of said stakes being provided with a supporting leg having an end that is formed at an angle other than a right angle to the plane of such leg and a block having an inclined surface on which the angular end of said supporting leg may rest whereby such leg easily may be caused to slide off of such block.

5. In a car bunk of the class described, the combination with a frame, of stakes associated with said frame, each of said stakes being formed to have a supporting portion that is provided with an angular bearing surface, pawls provided on said angular surface, a block having an inclined surface on which said angular bearing surface may rest whereby said angular bearing surface more easily may be caused to slide off of said block, notches provided in said inclined surface in which said pawls may engage and means whereby said block may be moved sidewise to cause said stake to be lowered.

6. In a car bunk of the class described, the combination with a frame, of guideways provided in the sides of said frame, a stake provided with an angular bearing surface and with pivot studs that are adapted to move in said guideways, pawls provided on said angular bearing surface, a block having an inclined surface that is provided with notches in which said pawls may engage whereby said stake may be fixedly secured at different desired positions longitudinally of said frame and a trip lever associated with toggle mechanism whereby said block may be moved sidewise of said frame to release said stake.

7. In a car bunk of the class described, the combination with a frame that is provided with a slot, of a stake formed to have a supporting member that is provided with pawls and adapted to project downwardly through said slot, a block on which said supporting member may rest, said block being provided with notches, in which said pawls may engage and toggle mechanism adapted to move said block sidewise to release said stake.

8. In a bunk of the class described, the combination with a supporting block, of toggle mechanism associated with said supporting block, and means for actuating said toggle mechanism to move said supporting block sidewise.

In witness whereof, I hereunto subscribe my name this 10th day of December A. D., 1913.

CHARLES O. DALE.

Witnesses:
FRANK WARREN,
A. HASKINS.

---

Copies of this patent may be obtained for five cents each, by addressing the "Commissioner of Patents, Washington, D. C."